United States Patent
Golias, Jr. et al.

(10) Patent No.: US 8,287,060 B1
(45) Date of Patent: *Oct. 16, 2012

(54) CABINET SHELF WITH KEYED SLOT

(75) Inventors: Bernard J. Golias, Jr., Twinsburg, OH (US); Robert J. Golias, Solon, OH (US); Gary W. James, Parma Heights, OH (US); Gary R. Kish, Parma, OH (US); Bernard J. Golias, Sr., Hinckley, OH (US)

(73) Assignee: Metal Fabricating Corporation, Cleveland, OH (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/270,549

(22) Filed: Nov. 13, 2008

Related U.S. Application Data

(63) Continuation-in-part of application No. 10/915,450, filed on Aug. 10, 2004, now Pat. No. 7,452,039.

(60) Provisional application No. 60/513,380, filed on Oct. 22, 2003.

(51) Int. Cl.
 *A47F 5/00* (2006.01)
(52) U.S. Cl. .......... 312/351; 108/60
(58) Field of Classification Search .......... 312/257.1, 312/348.3, 263, 265.5, 351; 211/135, 184, 211/186; 108/60, 61, 106–110, 180, 193; 220/529, 532, 533
See application file for complete search history.

(56) References Cited

U.S. PATENT DOCUMENTS

| | | | |
|---|---|---|---|
| 305,286 A * | 9/1884 | Campbell | 312/263 |
| 1,523,653 A | 1/1925 | Larson et al. | |
| 1,840,485 A * | 1/1932 | Butler | 206/0.81 |
| 1,907,414 A * | 5/1933 | Antrim | 126/275 R |
| 2,039,538 A * | 5/1936 | Kirsch | 248/264 |
| D116,600 S | 9/1939 | Thorn et al. | |
| 2,761,640 A | 9/1956 | Frater | |
| 2,889,055 A * | 6/1959 | Weller et al. | 211/184 |
| 3,195,735 A * | 7/1965 | Jay | 211/191 |
| 3,272,581 A * | 9/1966 | Stucki | 312/234.4 |
| 3,367,291 A * | 2/1968 | Evans | 108/64 |
| D211,139 S | 5/1968 | Nowak | |
| 3,389,949 A | 6/1968 | Studinski et al. | |
| 3,548,505 A | 12/1970 | Candilo | |
| 3,572,874 A | 3/1971 | Hassel | |
| 3,809,352 A | 5/1974 | Mathias | |
| 3,905,484 A * | 9/1975 | Dean et al. | 211/184 |
| 4,029,282 A | 6/1977 | Dauth | |
| 4,067,632 A | 1/1978 | Sekerich | |
| 4,070,076 A | 1/1978 | Zwillinger | |
| 4,155,312 A | 5/1979 | Thorkildson | |
| 4,258,892 A | 3/1981 | Craine | |
| 4,295,693 A | 10/1981 | Viklund | |
| 4,484,685 A * | 11/1984 | Williams | 209/703 |
| 4,485,922 A * | 12/1984 | Desmond et al. | 206/485 |
| 4,681,381 A | 7/1987 | Sevey | |

(Continued)

*Primary Examiner* — Janet M Wilkens

(74) *Attorney, Agent, or Firm* — Fay Sharpe LLP; James E. Scarbrough

(57) ABSTRACT

A metal cabinet assembly has first and second opposed side walls and at least one shelf interposed between the first and second side walls. The shelf has a first planar member including at least one elongated slot formed through the first planar member. A second member includes a first wall which extends from the first planar member. A first curved portion is formed between the first wall and the first planar member wherein the first wall has at least one key-shaped opening formed through the first planar wall and substantially aligned with the elongated slot. The key-shaped opening has various configurations.

17 Claims, 5 Drawing Sheets

U.S. PATENT DOCUMENTS

| | | | |
|---|---|---|---|
| 4,759,449 A * | 7/1988 | Gold | 211/43 |
| D297,111 S | 8/1988 | Thompson et al. | |
| 4,778,067 A * | 10/1988 | Bellerose | 211/187 |
| D300,147 S | 3/1989 | Meyer et al. | |
| D309,540 S | 7/1990 | Suttles et al. | |
| D311,285 S | 10/1990 | Mastrodicasa | |
| D314,114 S | 1/1991 | Steinman | |
| D323,091 S | 1/1992 | Boschetto | |
| D333,394 S | 2/1993 | Warrington | |
| D334,494 S | 4/1993 | Stein | |
| 5,209,452 A | 5/1993 | Goldberg | |
| 5,267,383 A | 12/1993 | Sawdon | |
| 5,329,835 A | 7/1994 | Timp et al. | |
| 5,470,143 A | 11/1995 | Gill | |
| 5,613,449 A | 3/1997 | Pullman | |
| 5,695,261 A | 12/1997 | Slesinger et al. | |
| 5,702,011 A | 12/1997 | Carroll | |
| D392,131 S | 3/1998 | Flagg | |
| 5,737,819 A | 4/1998 | Sawdon et al. | |
| D395,369 S | 6/1998 | Whittington | |
| 5,785,401 A | 7/1998 | Bowyer et al. | |
| D402,143 S | 12/1998 | Zapf | |
| D407,011 S | 3/1999 | Boije | |
| D424,330 S | 5/2000 | DeWitt | |
| 6,076,908 A | 6/2000 | Maffeo | |
| D429,417 S | 8/2000 | Liebers et al. | |
| D431,403 S | 10/2000 | Ford | |
| 6,170,674 B1 | 1/2001 | Caterinacci | |
| 6,273,281 B1 * | 8/2001 | Berglund | 211/187 |
| 6,279,445 B1 | 8/2001 | Rosene et al. | |
| 6,302,369 B1 | 10/2001 | Liebers et al. | |
| D455,755 S | 4/2002 | Levine et al. | |
| D457,364 S | 5/2002 | Shea | |
| D458,484 S | 6/2002 | Wood | |
| D461,977 S | 8/2002 | Mitchell | |
| 6,490,820 B1 | 12/2002 | Weakley | |
| 6,561,601 B1 | 5/2003 | Maffeo | |
| D507,131 S | 7/2005 | Pingel | |
| D510,220 S | 10/2005 | Sandy | |
| D525,059 S * | 7/2006 | Golias et al. | D6/511 |
| 7,128,379 B1 * | 10/2006 | LaBonia et al. | 312/351 |
| 7,171,757 B1 * | 2/2007 | Stoneberg | 33/458 |
| D541,563 S | 5/2007 | LaBonia, Jr. et al. | |
| 7,216,773 B2 * | 5/2007 | Golias et al. | 211/184 |
| D568,648 S * | 5/2008 | Roussel et al. | D6/511 |
| 7,452,039 B1 * | 11/2008 | Golias et al. | 312/257.1 |
| D593,783 S | 6/2009 | Golias, Jr. et al. | |
| 7,806,282 B1 * | 10/2010 | LaBonia et al. | 211/135 |
| 2003/0034319 A1 * | 2/2003 | Meherin et al. | 211/184 |

* cited by examiner

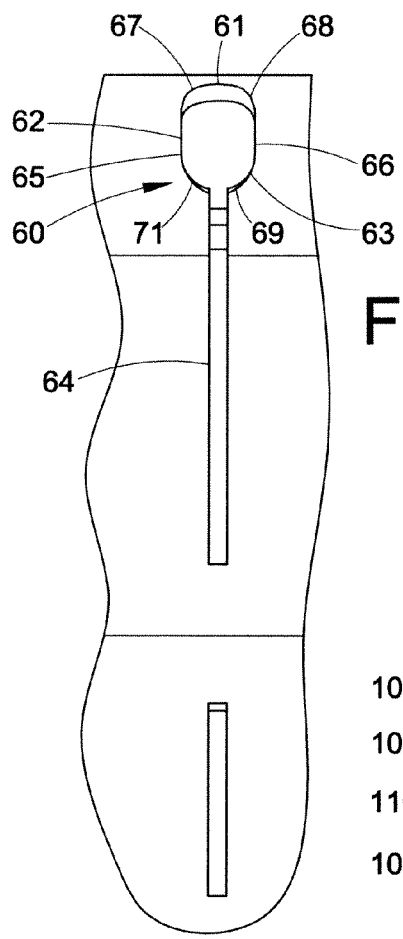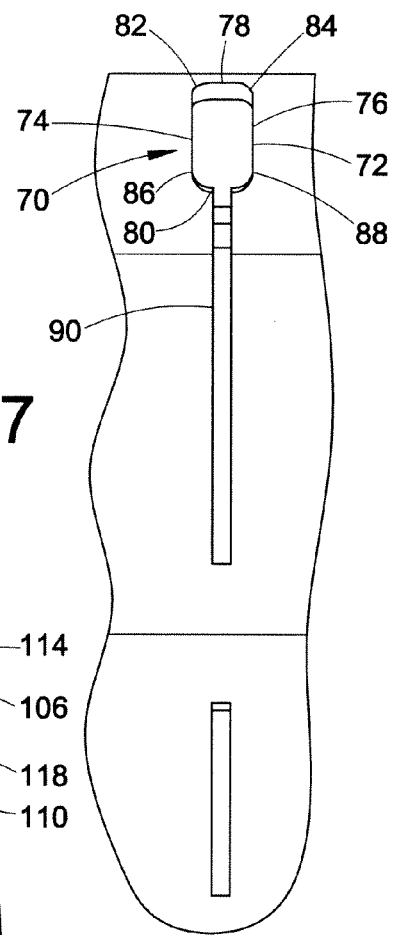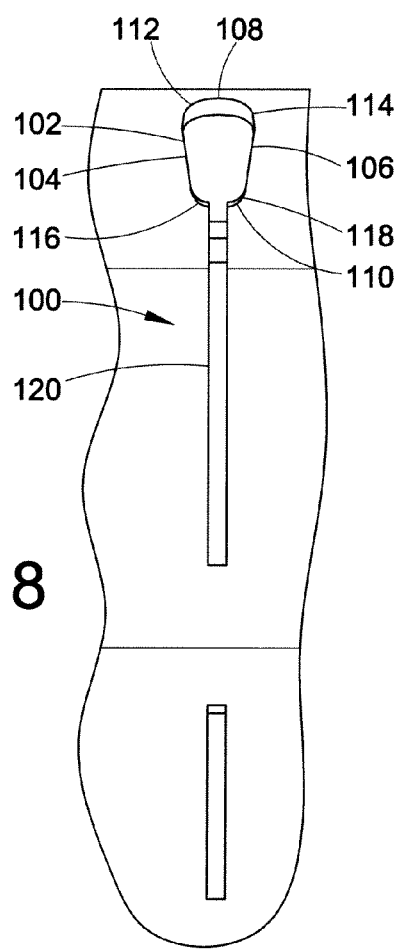

CABINET SHELF WITH KEYED SLOT

PRIORITY

This application is a continuation-in-part of U.S. Pat. No. 7,452,039, which was filed as application Ser. No. 10/915,450, on Aug. 10, 2004, which claimed priority to Provisional Application No. 60/513,380, filed on Oct. 22, 2003.

BACKGROUND

The present invention relates generally to units for storage. More particularly, the invention relates to an improved shelf member for a cabinet, such as a metal cabinet.

Metal cabinets and compartment bins are very versatile in that the cabinets can be placed in many areas, such as metal or woodworking shops, garages, as well as many other places. The cabinets and compartment bins can also provide storage in vehicles, such as trucks and vans. Metal cabinets have been used to store a variety of items such as threaded rod, wire, brake line, welding rods, as well as more common items, such as tools and fasteners.

When storing an item on a cabinet shelf, it can be difficult to retrieve the item if the shelf is substantially horizontal. For example, if one is trying to scoop a handful of bolts from a shelf, the vertical and straight front wall of the shelf tends to make it difficult to pull the bolts off the shelf.

Accordingly, it is desired to provide a cabinet with a shelf which aids in manually removing loose items from the cabinet.

SUMMARY OF THE DISCLOSURE

In accordance with one aspect of the disclosure, a shelf for a cabinet includes a planar member and a ramp extending at an obtuse angle from the planar member. The ramp includes a substantially key-shaped opening formed in the ramp.

A cabinet includes first and second opposing side walls and a shelf mounted to at least one of the side walls. The shelf includes a ramped front portion. The ramped front portion includes a substantially key-shaped opening.

In accordance with another aspect of the disclosure, a method for assembling a cabinet having two opposing side walls, a shelf having a ramped front portion and a substantially key-shaped opening formed in the front portion, and a divider includes the following steps: mounting the shelf to one of the side walls of the cabinet, and inserting the divider into the key-shaped opening.

Still other aspects of the disclosure will become apparent to those skilled in the art upon reading and understanding the following detailed description.

BRIEF DESCRIPTION OF THE DRAWINGS

The foregoing and other objects and advantages will in part be obvious and in part pointed out in the following description taken together with the accompanying drawings in which:

FIG. 6 is an enlarged plan view of an alternate keyed slot in accordance with another aspect of the disclosure;

FIG. 7 is an enlarged plan view of another keyed slot in accordance with another aspect of the invention;

FIG. 8 is an enlarged plan view of yet another keyed slot in accordance with another aspect of the disclosure.

DETAILED DESCRIPTION OF THE EMBODIMENTS

Referring now in greater detail to the drawings, wherein the showings are for the purpose of illustrating embodiments of the disclosure only, and not for the purpose of limiting the disclosure, FIGS. 1-5A illustrate a first embodiment of the present disclosure.

Figure 1:
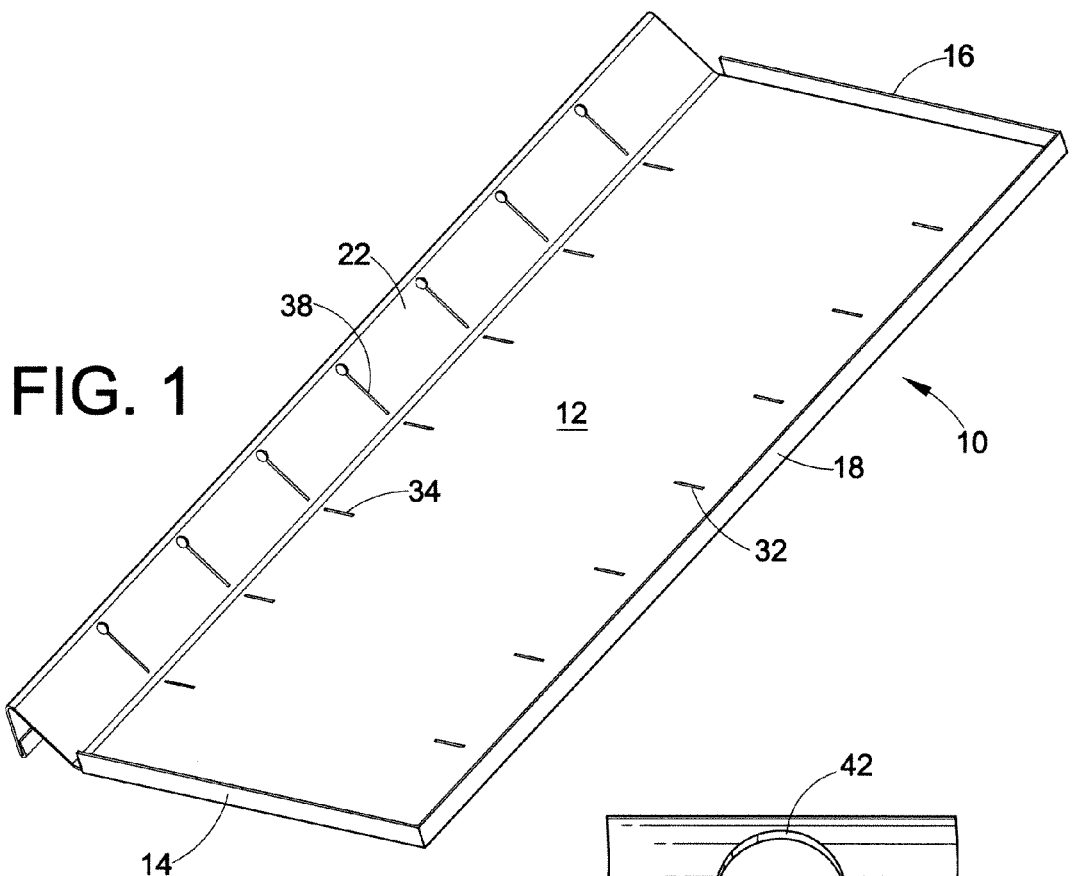
FIG. 1 is a rear perspective view of a cabinet shelf having a keyed slot.
Figure 4:
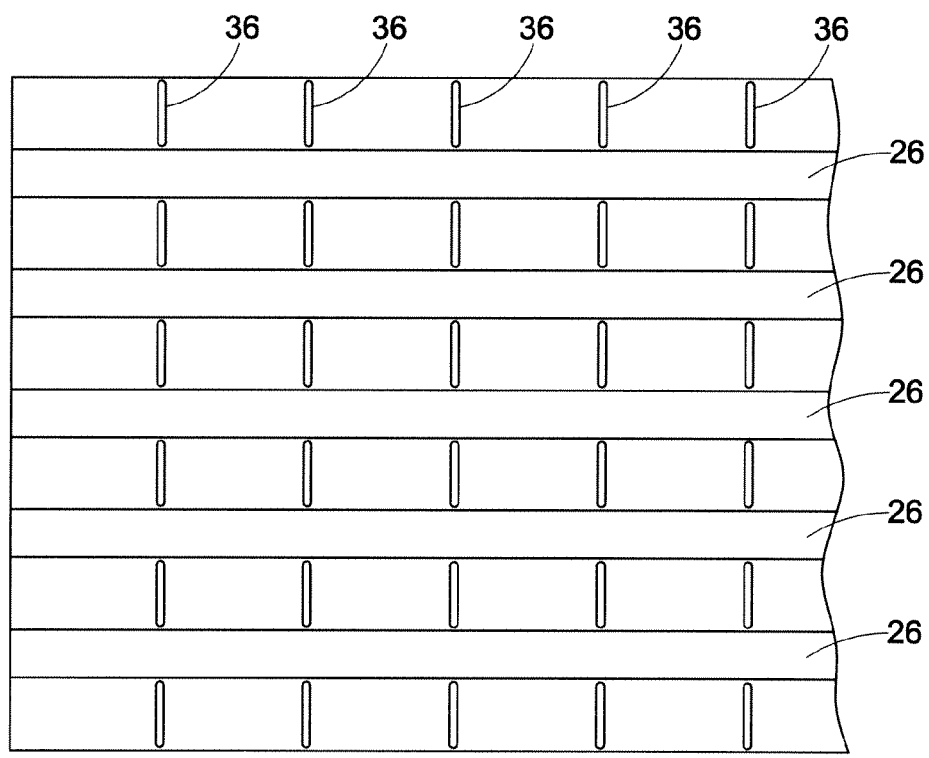
FIG. 4 is a front view of a cabinet including the cabinet shelf of FIG. 1.
Figure 5:
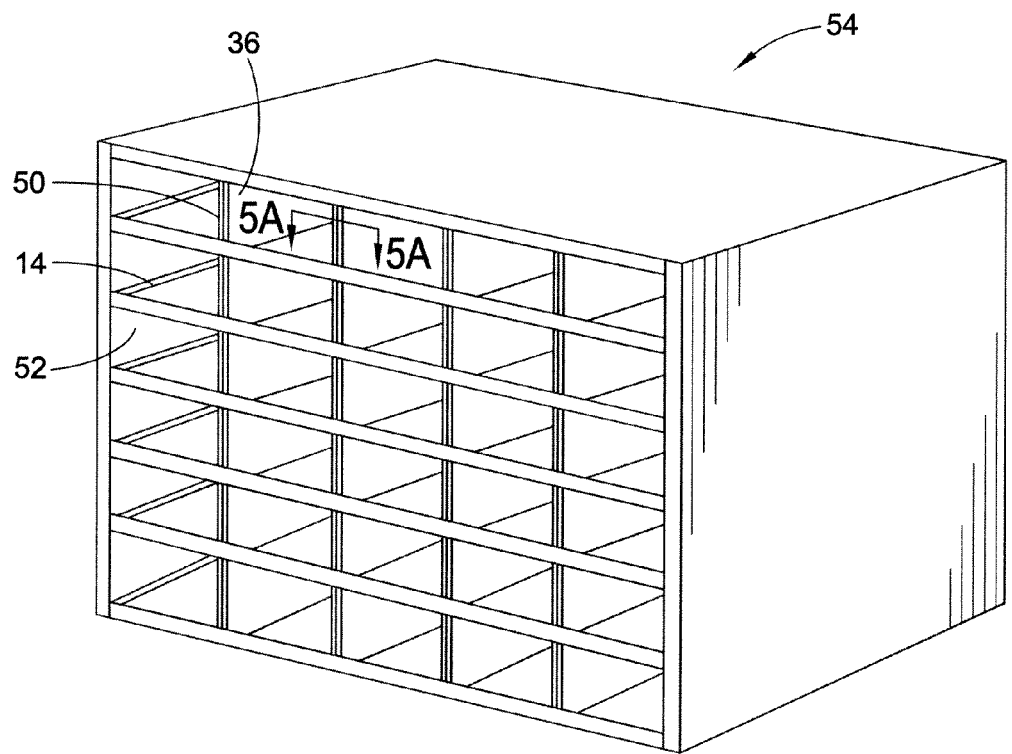
FIG. 5 is a perspective view of the cabinet depicted in FIG. 4.
Figure 5A:
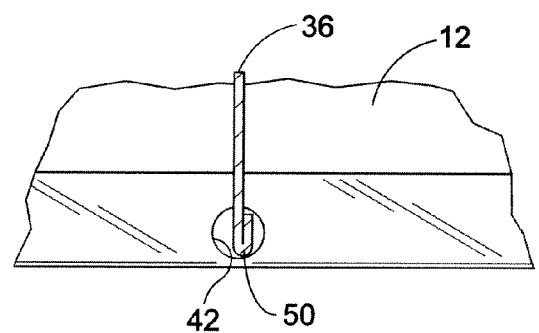
FIG. 5A is a cross-sectional view taken at line 5A-5A in FIG. 5.

With reference now to FIG. 1, a shelf 10 includes a sheet or planar surface 12, side walls 14 and 16, rear wall 18, and a ramped front portion 22. Shelf 10 is formed from a rigid metal or other suitable material. Sheet 12 is shown to be substantially rectangular; however, the sheet could take other suitable configurations for various shaped or sized cabinets. Side walls 14 and 16 each extend substantially orthogonally from sheet 12 and are substantially parallel to each other. The side wall 16 is positioned at an opposite longitudinal end of sheet 12 as the side wall 14. Rear wall 18 extends from an edge of the sheet between side walls 14 and 16 and also extends substantially orthogonally from sheet 12. Referring to FIG. 4, side walls 14 and 16 provide a surface of attachment for the shelf 10 to a side wall 52 corresponding to cabinet 54 (see FIG. 5). Likewise, the rear wall 18 also provides a surface to attach the shelf 10 to a rear wall of a cabinet.

Figure 2:
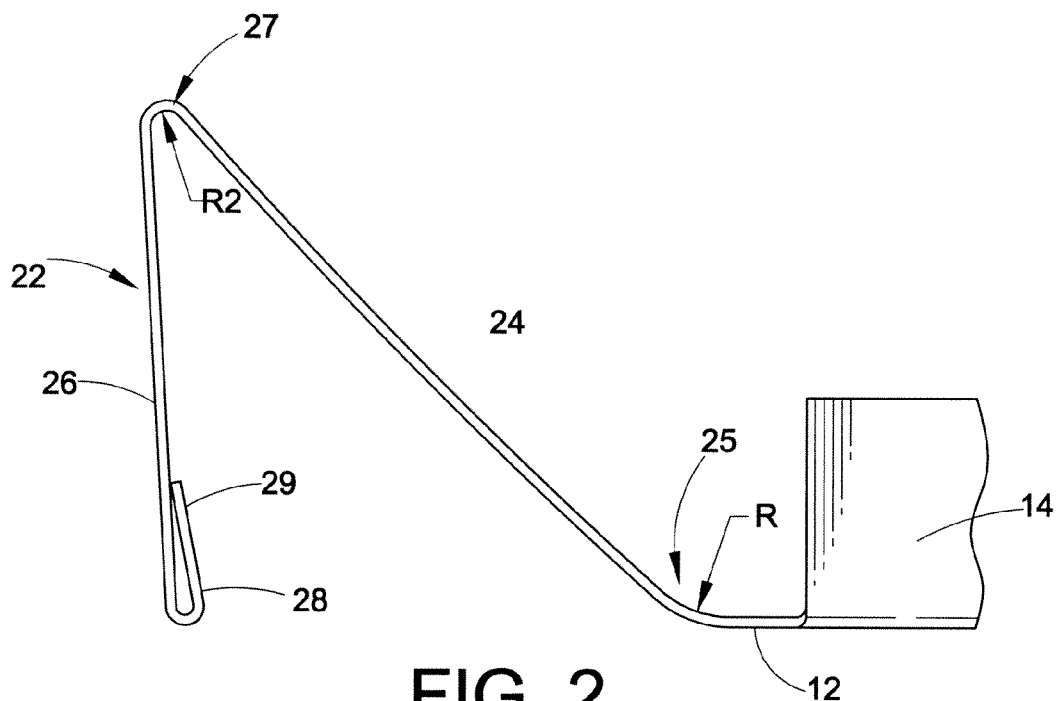
FIG. 2 is a side elevation view of a front portion of the shelf of FIG. 1.

Ramped front portion 22 is positioned opposite the rear wall 18. Referring now to FIG. 2, the ramped front wall portion includes an inclined first wall 24 and a straight or substantially vertical second wall 26. Inclined wall 24 extends upwardly from sheet 12 forming an obtuse angle between the inclined wall and the sheet. A curved or sloped portion 25 is formed between the horizontal sheet 12 and the inclined wall 24 so that a smooth transition occurs between the sheet 12 and the wall 24. A radius R is formed by the sloped portion 25. Vertical wall 26 extends in a downwardly direction from the inclined wall 24. A rounded bend or upper corner 27 is formed between walls 24 and 26. A radius $R_2$ may be formed by corner 27. Wall 26 forms the front wall when viewing the shelf 10 from the front of the cabinet (FIG. 4). Wall 26 can also include a crimped portion 28 at a lower most edge which has a radiused portion which provides a rounded edge for the front portion of the shelf 10. The crimped portion is bent upwardly and has a wall 29 which is bent toward wall 26.

With reference back to FIG. 1, the shelf further includes a plurality of rear slots 32 disposed adjacent the rear wall and a plurality of front slots 34 disposed adjacent the ramped front portion 22. Slots 32 can be equally spaced apart and parallel to each other. Likewise, slots 34 can be equally spaced apart and parallel to each other. The slots can be unevenly spaced as well without departing from the scope of the present invention. Referring to FIG. 4, slots 32 and 34 are aligned with one another and receive a portion of dividers 36 that divide the shelf 10 into a plurality of compartments defined by adjacent parallel slots.

Figure 3:
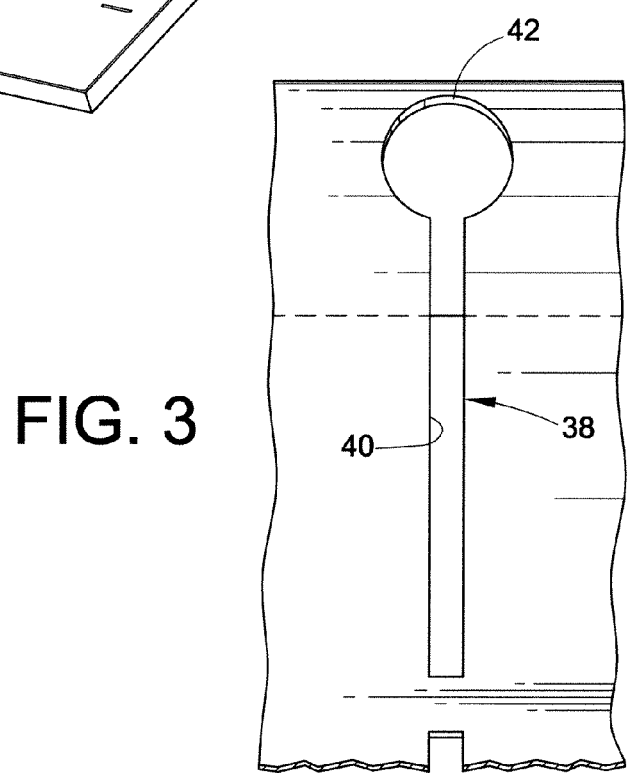
FIG. 3 is a close-up view of a keyed slot in a front wall portion of the shelf of FIG. 1.

The ramped front portion 22 also includes a plurality of openings or slots 38 aligned with rear slots 32 and front slots 34. Slots 38 in the ramped front portion also receive the same dividers 36 that slots 32 and 34 receive. Referring now to FIG. 3, each slot in the ramped portion can have a substantially key-shaped conformation, including a narrow elongated portion 40 terminating in a relatively wider circular or round aperture 42 adjacent the intersection of the inclined wall 24 and the vertical wall 26 of the ramped front wall. Aperture 42 provides a larger opening allowing for an easier insertion of the divider 36 into the slot 38, thus reducing assembly time. The narrow portion 40 extends from the wider portion 42 and terminates at or adjacent the planar surface 12. A reinforced rolled end 50 (FIG. 5A) of the divider can be received within the slot. The keyed slot 38 also adds strength and rigidity to a divider since the divider wall has support from the ramped wall on both sides of the divider. The slot further aids the divider wall in maintaining a vertical position in the cabinet.

The ramped front portion 22 further provides an abutment formed by the curved or sloped portion 25 so that when the user attempts to retrieve a handful of items from a compartment that is defined by two adjacent dividers 36 and the shelf 10, the ramped front portion serves as a scoop to aid the user in retrieving items from the shelf. There are no sharp edges for the items to become trapped in and become harder to retrieve. Furthermore, items that are not retrieved will roll back into the shelf and not fall from the shelf.

Referring to FIG. 6, an alternate key-shaped slot 60 is shown. The slot 60 has a first opening 62 which has an elongated, oval-shaped configuration and a narrow, elongated substantially rectangular-shaped portion 64 which extends from opening 62 along the face of inclined wall 24. Portion 64 extends from wall 63. Opening 62 is formed by walls 61, 63 and 65, 66. Walls 61 and 63 are substantially parallel to each other and walls 65, 66 are substantially parallel to each other. Walls 61, 63 can range from 0.1 to 1 inches. Rounded corners 67, 68, 69, 71 are formed between the walls (having a radius of about 0.06 to 0.375 inches). The keyed slot is positioned on the ramped shelf in a similar manner as the keyed slot of FIGS. 1-4.

Referring to FIG. 7, another alternate keyed slot 70 is shown. The slot 70 has a first elongated portion 72 which has a substantially rectangular-shaped appearance. The portion 72 has walls 74, 76 which are substantially parallel to each other and walls 78, 80 which are substantially parallel to each other and are shorter in length than walls 74, 76. Walls 74, 76 can range from 0.1 to 1 inches in length. The corners 82, 84, 86, 88 of the portion 72 are rounded or have a radius formed between walls 74-80 of about 0.06 to 0.375 inches. An elongated substantially rectangular narrow portion 90 extends from wall 80 and extends along the face of the inclined wall 24.

Referring to FIG. 8, another alternate keyed slot 100 is shown. The slot 100 has a first elongated portion 102 which has a substantially tapered configuration. The portion 102 has walls 104, 106 which taper toward each other and wall 108 formed between upper ends of the walls 104, 106 and a wall 110 formed between lower ends of the walls 104, 106. Wall 108 is longer than wall 110. The distance between walls 108 and 110 can range from about 0.1 to about 1 inches in length. Corners 112, 114, 116, 118 are rounded or have a radius formed between walls 104, 106, 108, 110 of about 0.06 to 0.375 inches. An elongated narrow substantially rectangular-shaped portion 120 extends from wall 110 and extends along the face of the inclined wall 24.

Figure 9:
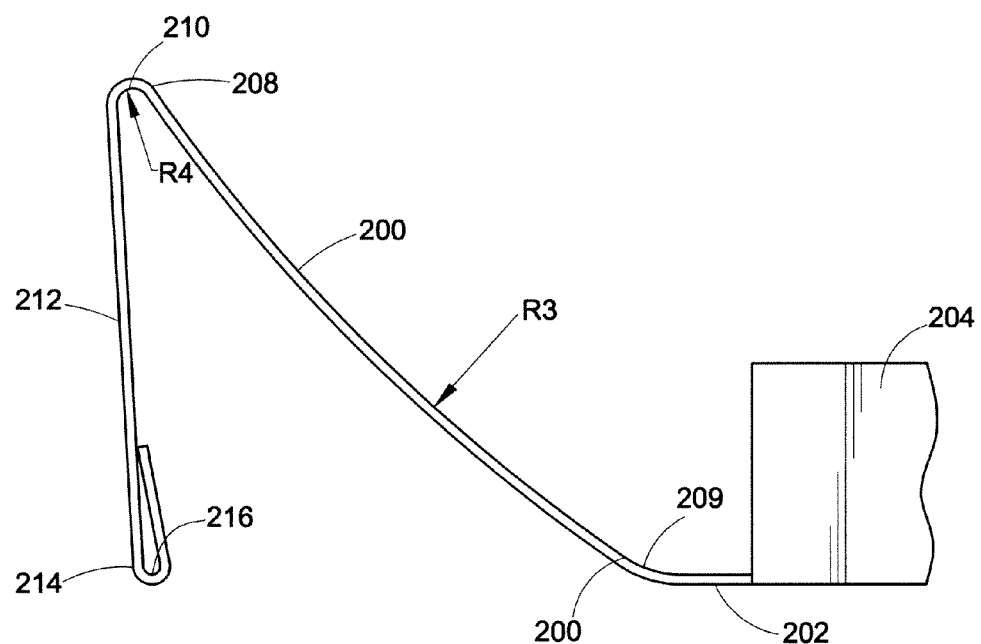
FIG. 9 is a side elevational view of a front portion of the shelf in accordance with another embodiment of the disclosure.

FIG. 9 illustrates another embodiment of the disclosure. The ramped portion of the shelf includes first portion 200 which extends from a horizontal wall 202 of the shelf 204. The portion 200 has a constant radius $R_3$ formed between a lower section 206 and an upper section 208. Radius $R_3$ can range from about 0.75 inches to about 4 inches. Lower section 206 further has a sloped or curved section 209 extending from the wall 202 of the shelf. A rounded or radiused corner 210 having a radius R4 (of about 0.1 inches) is formed between portion 200 and a second portion 212 which extends vertically downwardly from corner 210. A crimped portion 214 is formed at a lower end of portion 212 which has a radiused portion 216 which is bent upwardly and forms a rounded bottom edge of portion 212.

The shelf member has been described with reference to a preferred embodiment. Obviously, modifications and alterations will occur to others upon the reading and understanding of this specification. The specification is intended to include all such modifications and alterations insofar as they come within the scope of the appended claims or the equivalents thereof.

The invention claimed is:

1. A metal cabinet assembly comprising:
   first and second opposed side walls;
   at least one shelf interposed between said first and second side walls, said shelf comprising a first planar member including at least one elongated slot formed through the first planar member;
   said shelf further comprises a second member including a first wall which extends from the first planar member, wherein a first curved portion is formed between said first wall and said first planar member, wherein said first wall is formed by a continuous radius extending between said first curved portion and a second curved portion wherein said first wall has at least one key-shaped opening formed through said first wall and substantially aligned with the at least one elongated slot, said key-shaped opening having a first elongated oval-shaped portion at a first end of said key-shaped opening and a second portion extending from said first elongated portion;
   said second member includes a second wall extending vertically from said second curved portion wherein said second wall and said first wall have no parallel portions with respect to each other, wherein said second wall terminates in a rolled edge; wherein said second curved portion is formed between said second wall and said first wall and wherein said key-shaped opening is formed between said first curved portion and said second curved portion.

2. The cabinet assembly of claim 1, wherein said shelf further comprises a third wall which extends substantially orthogonally from the first planar member.

3. The cabinet assembly of claim 1, wherein said key-shaped opening first portion comprises an elongated portion formed adjacent an intersection of the first wall and the second wall of said second member.

4. The cabinet assembly of claim 1, wherein the second wall of said second member is situated substantially perpendicular to the first planar member.

5. The cabinet assembly of claim 4, wherein said key-shaped opening first portion is wider than said key-shaped opening second portion.

6. The cabinet assembly of claim 1, wherein said first curved portion comprises a radius.

7. The cabinet assembly of claim 1 wherein said second curved portion comprises a radius.

8. The cabinet assembly of claim 1, wherein said first portion of said key-shaped slot comprises first and second walls substantially parallel to each other and third and fourth walls substantially parallel to each other, wherein said first and second walls are longer than said third and fourth walls.

9. The cabinet assembly of claim 8, further comprising corners formed between said first and second walls and said third and fourth walls, wherein said corners are rounded.

10. The cabinet assembly of claim 1, wherein said first portion of said key-shaped slot comprises first and second walls which are tapered toward each other.

11. The cabinet assembly of claim 10, wherein said first portion of said key-shaped slot comprises third and fourth walls substantially parallel to each other, wherein said third wall is longer than said fourth wall.

12. The cabinet assembly of claim 11, further comprising corners formed between said first and second walls and said third and fourth walls, wherein said corners are rounded.

13. A metal cabinet assembly comprising:
first and second opposed side walls;
at least one shelf interposed between said first and second side walls, said shelf comprising a first planar member including at least one elongated slot formed through the first planar member;
said shelf further comprises a second member including a first wall which extends from the first planar member, wherein a first curved portion is formed between said first wall and said first planar member, wherein said first wall has at least one key-shaped opening formed through said first wall and substantially aligned with the at least one elongated slot, said key-shaped opening having a first elongated oval-shaped portion at a first end of said key-shaped opening and a second elongated portion extending from said first elongated portion;
said second member includes a second wall extending vertically from said first wall of said second member wherein said first wall and said second wall have no parallel portions relative to each other, wherein said second wall terminates in a rolled edge; wherein a second curved portion extends between said first wall and said second wall; and
wherein said first wall comprises a continuous radius extending between said first and second curved portions.

14. The cabinet assembly of claim 13, wherein said continuous radius of said first wall comprises a radius in the range of 0.75 to 4 inches.

15. The cabinet assembly of claim 13, wherein said first portion of said key-shaped slot comprises first and second walls substantially parallel to each other and third and fourth walls substantially parallel to each other, wherein said first and second walls are longer than said third and fourth walls.

16. The cabinet assembly of claim 13, wherein said first portion of said key-shaped slot comprises first and second walls which are tapered toward each other.

17. The cabinet assembly of claim 16, wherein said first portion of said key-shaped slot comprises third and fourth walls substantially parallel to each other, wherein said third wall is longer than said fourth wall.

\* \* \* \* \*